W. W. REVELL.
VEHICLE WHEEL TIRE.
APPLICATION FILED JAN. 27, 1911.

1,029,632.

Patented June 18, 1912.

WITNESSES
Johna Bergstrom
E. F. Murdock

INVENTOR
William W. Revell
BY Munn Co
ATTORNEYS

UNITED STATES PATENT OFFICE.

WILLIAM WEST REVELL, OF WALDEN, NEW YORK.

VEHICLE WHEEL-TIRE.

1,029,632.  Specification of Letters Patent.  Patented June 18, 1912.

Application filed January 27, 1911. Serial No. 604,966.

*To all whom it may concern:*

Be it known that I, WILLIAM WEST REVELL, a citizen of the United States, and a resident of St. Andrews, Walden, in the county of Orange and State of New York, have invented a new and Improved Vehicle Wheel-Tire, of which the following is a full, clear, and exact description.

The principal object which the present invention has in view is to provide a tire adapted for employment on self-propelled vehicles having the necessary friction properties and tire resiliency, without the usual frailty or being subject to damage by puncture.

With this object in view the invention consists primarily in forming a rigid tire constructed from laminated sheets of material having the needed adhesive property for gripping the road, and provided with the further quality of imperviousness to the oil, water and other deleterious materials on the public road.

It further consists in constructing a tire body so that a plurality of reinforcing plates are employed, extended circumferentially for clamping in form the gripping material above referred to.

It further consists in forming a means of attachment for the tire to the wheel structure, permitting a relative movement between the said wheel and tire, and in forming a resilient or yielding cushion interposed between the wheel and tire to yield to the impact of obstacles on the road.

One embodiment of the present invention is disclosed in the structure illustrated in the accompanying drawings, in which like characters of reference denote corresponding parts in all the views, and in which—

Figure 1:
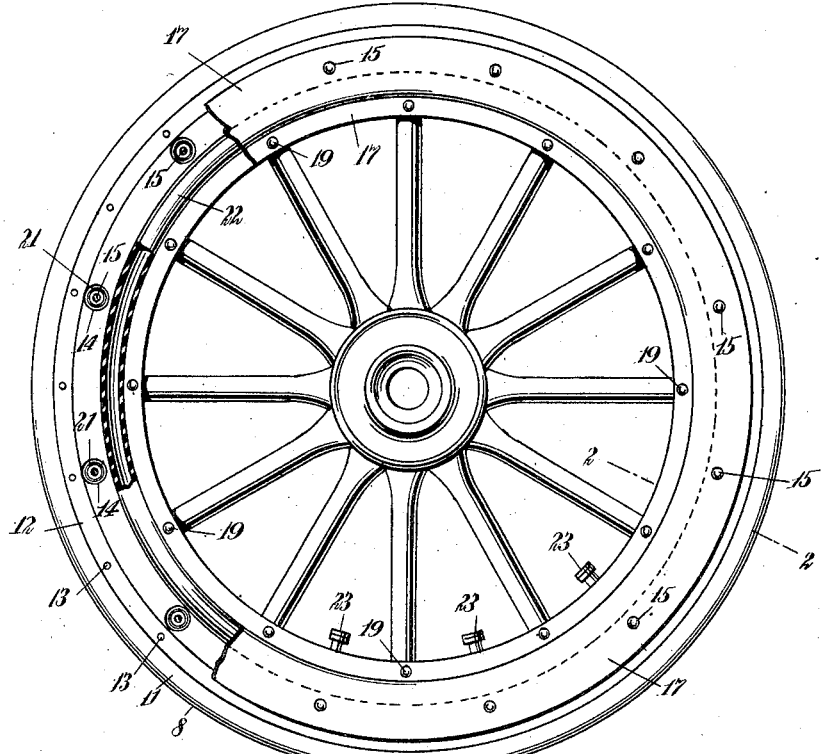
Figure 2:
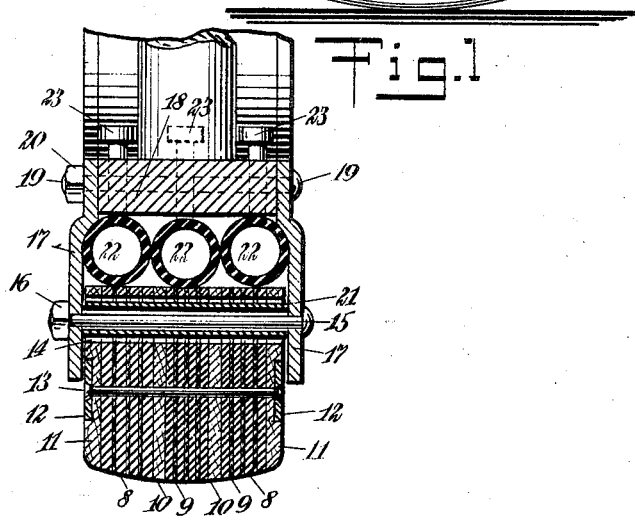

Figure 1 is a side view of a wheel provided with a tire constructed and arranged in accordance with the present invention; Fig. 2 is a cross section of the felly and tire, taken on the line 2—2 in Fig. 1.

As shown in the drawings, the tire is constructed in two sections, a rigid section and a cushion or resilient section. The rigid section is built up from a number of laminated sheets 8, 8. The sheets 8, 8, are manufactured from a composition containing in proper proportions oil, asbestos and wood pulp, and any suitable adherent such as certain forms of rubber cement. This composition, when formed, is adapted for rolling or pressing into suitable sheets, the sheets being cut into rings having a cross section such as illustrated in the accompanying drawings. These rings are preferably adhered each to the other by interposing between the rings layers of rubber or other suitable cement 9, 9. If desired, the sections from which the tire is formed, as shown in the drawings, which sections are supported by wood rings 10, 10, may be placed in suitable clamps and given the desired pressure to render the same rigid and sufficiently resistant to puncturing materials to which they are, in tire form, subject on the road. If the sections of laminated sheets 8, 8, are thus formed, they are disposed substantially as shown in Fig. 2 of the drawings, with the interposed wood rings 10, 10 and between the side plates 11, 11. The plates 11, 11 are preferably composite in construction, being formed from the wood 10 and the metal clamping plates 12, 12. The plates 12 are united by means of rivet bolts 13, 13. When the bolts 13, 13 are inserted in the plates 12, 12, as shown in the drawings, and headed, the tire is complete, unless it is desired to provide the same with a coating of paint or other surface.

At suitable intervals the tire is provided with a series of perforations 14, 14. The perforations 14, 14 are designed to receive in holding relation the guide bolts 15, 15. The bolts 15, 15 are provided with screw threads at one end to receive the nuts 16, 16. The bolts are extended through perforations provided in the rim flanges 17, 17. The flanges 17, 17 are rigidly bolted to the felly 18 of the wheel by means of screw bolts 19, 19 and nuts 20, 20.

Inserted within the perforations 14 to surround the bolts 15 are thimbles 21. The thimbles 21 are formed to a length greater than the width of the completed tire, the purpose of such construction being to receive the pressure of the flanges 17 when the nuts 16 are set up on the bolts 15. The enlargement of the perforations 14 over and above the diameter of the thimbles 21 is to permit a range of action of the tire independent of the wheel and the flanges 17 thereof.

The above mentioned independent action of the tire is controlled and buffered by the pneumatic cushion tubes 22, 22. The tubes 22 are disposed, as shown in the drawings, between the felly 18 and the tire in such manner as when distended they press outward against the tire at all points. The tubes are supplied with air through valves 23, 23, each tube having an independent valve. Using thus a plurality of tubes it will be understood that there is avoided the danger, should such exist, of losing the entire resiliency of the wheel by accident to the air cushion, it being improbable that all of the tubes 22 would, at the same instant, become damaged.

Having thus described my invention, what I claim as new and desire to secure by Letters Patent is:—

A vehicle tire, comprising a plurality of ring sections separated and flanked by reinforcing wooden rings, said ring sections being composed of a plurality of laminated composition rings impervious to water and interleaved by a suitable cement; metal clamping rings embedded in the outer wooden rings; and fastening devices connecting the said clamping rings and passing through the reinforcing and composition rings to bind the whole into a single structure.

In testimony whereof I have signed my name to this specification in the presence of two subscribing witnesses.

WILLIAM WEST REVELL.

Witnesses:
WILLIAM H. FAULKNER,
CHARLES R. TEARSE.